Aug. 17, 1965 F. K. BECKER 3,201,703

WAVE SAMPLING APPARATUS EMPLOYING COMMON POTENTIAL SWITCH

Filed April 7, 1960

INVENTOR
F. K. BECKER
BY Harry C. Hart
ATTORNEY

United States Patent Office 3,201,703
Patented Aug. 17, 1965

3,201,703

WAVE SAMPLING APPARATUS EMPLOYING COMMON POTENTIAL SWITCH

Floyd K. Becker, Summit, N.J., assignor to Bell Telephone Laboratories, Incorporated, New York, N.Y., a corporation of New York Filed Apr. 7, 1960, Ser. No. 20,751
4 Claims. (Cl. 328—150)

Figure 1:
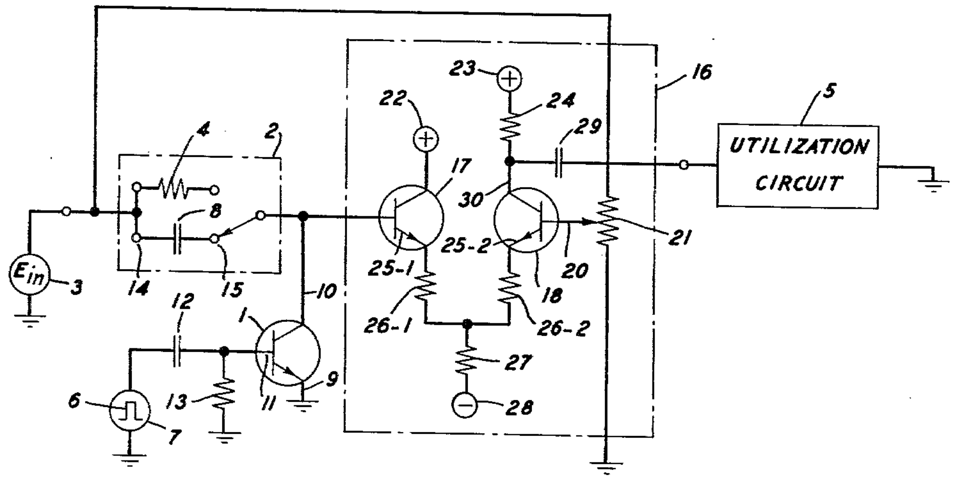

This invention relates to circuits which sample an incoming signal. It has for its general object the simplification of the gating required in such circuits.

One kind of sampling circuitry, namely, one of the sample and hold variety, is of particular importance in systems where an analog input signal is to be converted into its coded counterpart, and it is a related object of the invention to facilitate such conversion.

Typical sample and hold circuits provide a storage element, such as a capacitor, for holding a sampled signal until subsequent sampling can take place. It has been standard practice to connect the capacitor and a signal source to a common ground terminal with sampling accomplished by the controlled closure of a switch connected between the above-ground terminals of the element and the source. If the sampling or switching pulses controlling the switch are applied with respect to the common ground, the switch assumes a complex configuration or requires auxiliary components. It is a further object of the invention to simplify the switch and eliminate the need for auxiliary components.

Accordingly, a corollary object of the invention is to effect sampling by a switch having one of its conduction terminals at the common potential with respect to which signals are applied to and extracted from the circuit.

The conventional sample and hold circuit may also be adapted to provide pulse amplitude modulation by replacing the storage capacitor with a resistive element, subject to the difficulties occasioned by the above-ground location of the switch. It is a still further object of the invention to obtain pulse amplitude modulation without the need for above-ground switching while rendering the circuit capable of performing the sample and hold function when a single circuit element is changed.

The invention is characterized by the employment of a grounded switch to directly connect a buffer element across the terminals of a signal source during the sampling period when the switch is closed. The buffer element serves to store a signal or absorb its energy depending on whether holding or pulse modulation is required. The desired output of the circuit is obtained by taking the difference between the voltages applied to the two terminals of the buffer element.

The switch is conveniently of the variety providing a low resistance path across its terminals in response to an applied control signal and a substantially open circuit in the absence thereof.

When the buffer element is a capacitor, energy from the source is stored in it during the switching interval during which a sampling pulse is applied to the switch. At the termination of the switching interval the charge on the capacitor is proportional to the magnitude of the source voltage then existing. At the instant the switch enters its open circuit condition, the total voltage across it is of zero magnitude. It is composed of the algebraic sum of the sampled magnitude which remains substantially constant, aside from any capacitive leakage, and the instantaneous voltage of the source. During the holding period any change in the magnitude of the source voltage will occur to the same extent at each of the two terminals of the capacitor, and the magnitude of the sampled voltage stored by the capacitor is determined, according to the invention, by providing a differencing network directly across its terminals.

The differencing network is formed by modifying the output impedance converter normally required in a sample and hold circuit. Since the voltage stored by the capacitor ideally remains constant during the holding period, the output circuit must present a high impedance, ideally infinite. Otherwise, the capacitor would discharge prematurely. The conventional impedance converter is modified for the purposes of the invention by providing it with two inputs and requiring its output to be representative of the difference therebetween.

When, as prescribed by the invention, the buffer element is a resistor, the output of the differencing network is the pulse amplitude modulated form of the input signal.

Figure 2A:
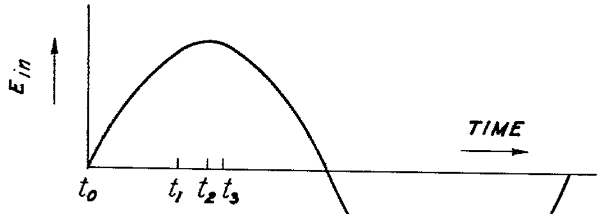
Figure 2B:
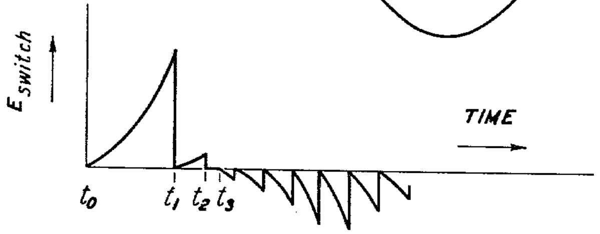
Figure 2C:
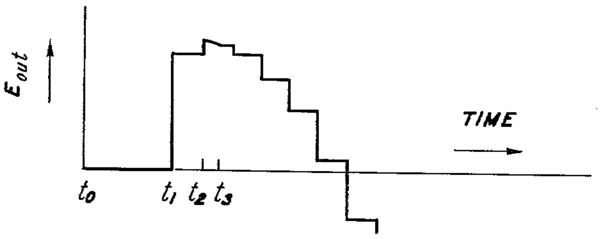

The above-mentioned objectives and the nature of the invention will be better understood after considering a preferred embodiment thereof, taken in conjunction with the drawings, in which:

FIG. 1 is a sample and hold circuit according to the invention employing a grounded emitter transistor switch and a transistor output circuit serving the dual function of an impedance converter and a differencing amplifier; and FIGS. 2*a*–2*c* are typical waveforms appearing at various points of the circuit set forth in FIG. 1.

Referring now to FIG. 1, there is illustrated the combination of circuit components which permit the sampling of an input signal $E_{in}$ through the use of a grounded switch 1. The buffer element 2 connected to the input signal source 3 either is dissipative or provides storage. In the former case a resistor 4 is used, and the signal received at the output utilization circuit 5 is pulse amplitude modulated, as controlled by the switching signals 6 originating with the pulse source 7. When storage is desired, a capacitor 8 may be employed. In that case closure of the grounded switch 1 by a sampling pulse 6 connects the capacitor 8 across the terminals of the input signal source 3, and a voltage proportional to the signal $E_{in}$ is stored. When there is no intervening impedance in a closed path including the signal source 3 and the capacitor 8, the stored magnitude is identical with that of the input signal $E_{in}$ at every instant of the sampling. For this reason the switching transistor 1 is chosen to display a negligible impedance between its grounded emitter 9 and its collector 10 when a pulse 6 is applied to the base electrode 11. A coupling condenser 12 is connected to the base 11 to provide isolation for the switching pulse source and back bias for the switch 1 during the absence of a switching pulse 6. The switching voltage is developed across a resistor 13 between the base 11 and ground. As long as the switch 1 is closed, any variation in the input signal $E_{in}$ is accurately reflected in a corresponding variation in the stored signal, and the magnitude of the stored signal is directly that of the input signal $E_{in}$ at the moment the sampling pulse 6 terminates. On the termination of the pulse 6 the switch 1 becomes effectively an open circuit. At the input terminal 14 of the capacitor 8 the voltage is always that of the source. At the other terminal 15 it is the difference between the source voltage and that stored. Conseqeuntly, a differencing amplifier 16 or subtractor circuit interconnecting the two terminals 14 and 15 provides a measure of the sampled signal provided the capacitor 8 has a capacitance of sufficient magnitude that its time constant with the input impedance of the differencing amplifier 16 is large enough to prevent appreciable drain of the sampled signal during the storage interval. The differencing amplifier 16 is of the kind shown on page 152 of "Transistor Circuit Engineering" edited by Shea (John Wiley, 1957). It is made up of two like transistors 17 and 18, the first having its base 19 connected to the switching transistor 1 and the second having its base 20 connected to the signal input source 3 by way of a balancing resistor 21. The first transistor 17 is directly connected to a biasing source 22, while the second transistor 18 is connected to a similar source 23 by way of a load resistor 24. The emitter electrodes 25–1 and 25–2 of both transistors 17 and 18 are in series with like padding resistors 26–1 and 26–2 which in turn have a common terminal connected to an emitter resistor 27 in series with a negative source 28 of voltage. The padding resistors 26–1 and 26–2 are chosen to have substantial resistive magnitudes in order to provide the differencing amplifier 16 with high input impedances. The output of the differencing amplifier 16 taken by the utilization circuit 5 is derived through a coupling condenser 29 directly connected to the collector 30 of the second transistor 18. The balancing resistor 21 is adjusted to assure that the output samples are of substantially constant magnitude during the holding period. It is to be noted for the differencing amplifier shown the input signals must be of small magnitude in order to prevent a signal applied to one of the transistors from cutting the other off.

To better understand the way in which the invention performs the sample and hold function, assume that the switch 1 is initially open and that the input signal $E_{in}$ applied to the circuit of FIG. 1 has the sinusoidal waveform shown in FIG. 2*a*. Provided that the differencing amplifier 16 has a substantial input impedance, the voltage $E_{switch}$ appearing across the switch terminals 9 and 10 will be closely that of the input signal $E_{in}$, as is shown in FIG. 2*a* during the time interval from $t_0$ to $t_1$. At the instant $t_1$ a switching pulse 6 is momentarily applied and the switch voltage $E_{switch}$ drops to zero, allowing the capacitor 8 to be charged. When the switching pulse 6 terminates, the voltage $E_{switch}$ appearing across the switch once again begins to change at the same rate as the input voltage $E_{in}$, although its magnitude is reduced by the amount of the sampled signal stored by the capacitor 8. The switch voltage of FIG. 2*b* appearing at the base 19 of the first transistor 17 in the interval $t_1$ to $t_2$ causes the output voltage $E_{out}$ to decrease. However, the signal $E_{in}$ FIG. 2*b* during the time interval from $t_0$ to $t^1$. At the the inverse effect and causes the output voltage $E_{out}$ to increase. The net result is that the signals of FIGS. 2*a* and 2*b* are subtracted from each other and the output $E_{out}$ is as indicated in FIG. 2*c*.

If one of the switching pulses 6 has a substantial time duration, as from $t_2$ to $t_3$ in FIG. 2*b*, the departure of the output $E_{out}$ from discrete samples of constant magnitude follows the pattern indicated in FIG. 2*c*. This difficulty is avoided by requiring that the switching period be but a small fraction of the holding period.

What is claimed is:

1. A circuit for sampling and holding the input signal of a source, which comprises storage means having first and second terminals, the first terimnal of said storage means being connected to said source, switching means for causing the momentary magnitude of said input signal to be stored in said storage means, said switching means being activated by a switching signal and interconnecting the second terminal of said storage means with a common ground point of said circuit and differencing means having first and second input terminals respectively connected to the first and second terminals of said storage means for obtaining, during the absence of said switching signal, an output signal proportional to the difference between the instantaneous amplitude of said input signal and the amplitude of the sampled signal held in storage as augmented by said input signal.

2. Apparatus for deriving from a signal source a sequence of discrete samples of the amplitude of the signal of said source and for applying them to a utilization circuit which comprises a subtractor having two input points and an output point, a first path extending directly from said source to said first input point, a second path extending from said source to said second input point and containing only a storage element, a switch having two conduction terminals and a control terminal, one of said conduction terminals being connected to a point of fixed potential, the other of said conduction terminals being connected to said second input point, means for repeatedly applying control signals to said control terminal, thereby to establish a low impedance path between said conduction terminals in response to each applied control signal, and means for applying the wave derived at the output point of said subtractor to said utilization circuit, whereby said derived wave is constituted of a sequence of samples of the wave of said source.

3. Sample apparatus for deriving, from a continuous wave of a source, connected between an input point of said apparatus and a point of fixed potential, a staircase wave counterpart of said continuous wave and for making said counterpart available at an output point of said apparatus which comprises a subtractor having two input terminals and an output terminal, a direct connection from said input point to one of said input terminals, a path extending from said input point to the second of said input terminals and including only a charge storage device, a direct connection from said output terminal to said output point, and means for substantially instantaneously connecting said storage device to said point of fixed potential.

4. A circuit for sampling a signal from an external source which comprises an input point to which the signal is applied from the external source, buffer means including a resistor and a capacitor and switchable therebetween, said buffer means having a first terminal connected to said input point and a second terminal, means for momentarily connecting said second terminal to a common potential point, and differencing means having input terminals respectively connected to the first and second terminals of said buffer means, the output of said differencing means being proportional to the sampled amplitude of said signal.

References Cited by the Examiner

UNITED STATES PATENTS

| | | | |
|---|---|---|---|
| 2,433,287 | 12/47 | Mercer | 328—149 |
| 2,679,588 | 5/54 | Henry | 328—146 |
| 2,692,333 | 10/54 | Holmes | 328—147 |
| 2,715,718 | 8/55 | Holtje | 328—147 |
| 2,752,491 | 6/56 | Ringoen | 328—134 |
| 2,762,978 | 9/56 | Norton | 328—148 |
| 2,834,883 | 5/58 | Lukoff | 328—151 |
| 2,946,901 | 7/60 | Kyler | 307—88.5 |
| 2,985,808 | 5/61 | Ketchledge | 307—88.5 |
| 3,020,397 | 2/62 | Pierce et al. | 328—148 |
| 3,109,103 | 10/63 | Wilhelmsen | 307—88.5 |

JOHN W. HUCKERT, *Primary Examiner.*

HERMAN KARL SAALBACH, *Examiner.*